United States Patent
Park et al.

(10) Patent No.: US 9,182,257 B2
(45) Date of Patent: Nov. 10, 2015

(54) AIR DATA SENSOR DEVICE

(75) Inventors: Young Min Park, Daejeon (KR); Ki Jung Kwon, Daejeon (KR); In Ho Choi, Daejeon (KR)

(73) Assignee: Korea Aerospace Research Institute, Deajeon (KR)

( * ) Notice: Subject to any disclaimer, the term of this patent is extended or adjusted under 35 U.S.C. 154(b) by 571 days.

(21) Appl. No.: 13/518,011

(22) PCT Filed: Dec. 17, 2010

(86) PCT No.: PCT/KR2010/009068
§ 371 (c)(1),
(2), (4) Date: Jun. 21, 2012

(87) PCT Pub. No.: WO2011/078522
PCT Pub. Date: Jun. 30, 2011

(65) Prior Publication Data
US 2012/0265453 A1    Oct. 18, 2012

(30) Foreign Application Priority Data
Dec. 24, 2009  (KR) .................. 10-2009-0130729

(51) Int. Cl.
G06F 19/00 (2011.01)
G01D 21/02 (2006.01)
G01D 11/24 (2006.01)
G01P 13/02 (2006.01)

(52) U.S. Cl.
CPC .............. G01D 21/02 (2013.01); G01D 11/245 (2013.01); G01P 13/025 (2013.01)

(58) Field of Classification Search
CPC .......... G01P 13/025; G01P 5/16; G01P 5/165
USPC ......................................... 73/861.65, 861.68
See application file for complete search history.

(56) References Cited

U.S. PATENT DOCUMENTS

| | | | |
|---|---|---|---|
| 4,378,696 A * | 4/1983 | DeLeo et al. ................... 73/180 |
| 6,038,932 A * | 3/2000 | Wandel et al. ............. 73/861.65 |
| 6,305,218 B1 * | 10/2001 | Foster .......................... 73/178 R |
| 6,557,243 B2 * | 5/2003 | Feeley et al. ..................... 29/611 |
| 8,256,284 B2 * | 9/2012 | Vozhdaev et al. .......... 73/170.02 |
| 2007/0107510 A1 * | 5/2007 | Agami et al. .................... 73/182 |

FOREIGN PATENT DOCUMENTS

KR    1020070017279 A    2/2007

OTHER PUBLICATIONS

Park et al., Development of Servo Type Angle-of-Attack Sensor for UAV, Journal of the Korean Society for Aeronautical & Space Sciences, May 2009 vol. 37 No. 5, p. 511-517.*
Mi-Hyun Park, Study of Servo Type Angle of Attack Sensors for UAV, Inha University Graduate School, Aerospace Engineering Department, Feb. 2009.
Mi-Hyun Park et al., Development of Servo Type Angle-of-Attack Sensor for UAV, Journal of the Korean Society for Aeronautical & Space Sciences, May 2009 vol. 37 No. 5, pp. 511-517, ISSN 1225-1348.
International Search Report received in PCT/KR2010/009068 Mailed Aug. 30, 2011.

* cited by examiner

*Primary Examiner* — Edward Raymond
(74) *Attorney, Agent, or Firm* — Edell, Shapiro & Finnan, LLC

(57) ABSTRACT

An air data sensor device using a flow around a cylinder is provided. The air data sensor device may include a sensor measurement unit which includes a sensor body provided in a cylindrical form including a hollow inside, a plurality of pressure measurement holes disposed on an outside of the sensor body, and a thermostat attached to one side of the sensor body, and a signal processing unit which includes a pressure sensor connected to the plurality of pressure measurement holes, and a microprocessor connected to the pressure sensor to perform calculation. A main pressure measurement hole having a high pressure value may be selected from the plurality of pressure measurement holes, pressure distribution may be calculated, and at least one of an angle of attack, a static pressure, and a total pressure may be calculated using the pressure distribution.

6 Claims, 4 Drawing Sheets

AIR DATA SENSOR DEVICE

TECHNICAL FIELD

The present invention relates to an air data sensor device, and more particularly, to an air data sensor device minimizing errors in obtaining an angle of attack, a total pressure, and a static pressure, enabling quick and accurate calculation even under a low-speed high-attack-angle condition, preventing freezing with a small size and low weight by facilitating insertion of a heater when used for preventing freezing in an airplane, and expanding an attack angle measurement area by increasing a number of sensors around a cylinder while maintaining the measurement accuracy.

BACKGROUND

Various parts are used in an air plane, including sensors for measuring physical values. Among various types of sensors, a data sensor measures an air flow. The data sensor measures data of the air to obtain an angle of attack, a total pressure, and a static pressure. In general, a multi-hole Pitot-static sensor, a vane type multi-function sensor, an integrated multi-function probe, and the like are used.

Those sensors may be classified into a rotation type that rotates corresponding to a flow direction, and a static type that is fixed irrespective of the flow. The rotation type is inefficient in terms of a response speed due to rotation of a mechanical part and generates more errors at a low speed. The static type generates more errors when the angle of attack is large. In particular, in case of a rotation-type probe, weight and price may increase because a lot of mechanical parts are used.

Accordingly, there is an increasing demand for a data acquiring technology implementing high measurement accuracy as well as a low price, a small size, and a low weight.

SUMMARY

In accordance with example embodiments of the invention, an air data sensor device uses a flow around a cylinder. The air data sensor device may include a sensor measurement unit which includes a sensor body provided in a cylindrical form including a hollow inside, a plurality of pressure measurement holes disposed on an outside of the sensor body, and a thermostat attached to one side of the sensor body, and a signal processing unit which includes a pressure sensor connected to the plurality of pressure measurement holes, and a microprocessor connected to the pressure sensor to perform calculation. A main pressure measurement hole having a high pressure value may be selected from the plurality of pressure measurement holes, pressure distribution may be calculated, and at least one of an angle of attack, a static pressure, and a total pressure may be calculated using the pressure distribution.

An aspect of the present invention provides an air data sensor device minimizing errors in obtaining an angle of attack, a total pressure, and a static pressure and enabling quick and accurate calculation even under a low-speed and high-attack-angle condition.

Another aspect of the present invention provides an air data sensor device capable of preventing freezing even with a small size when used for freezing prevention in an airplane by facilitating insertion of a heater.

Still another aspect of the present invention provides an air data sensor device capable of expanding an attack angle measurement area by increasing a number of sensors around a cylinder while maintaining the measurement accuracy.

DETAILED DESCRIPTION

Figure 1:
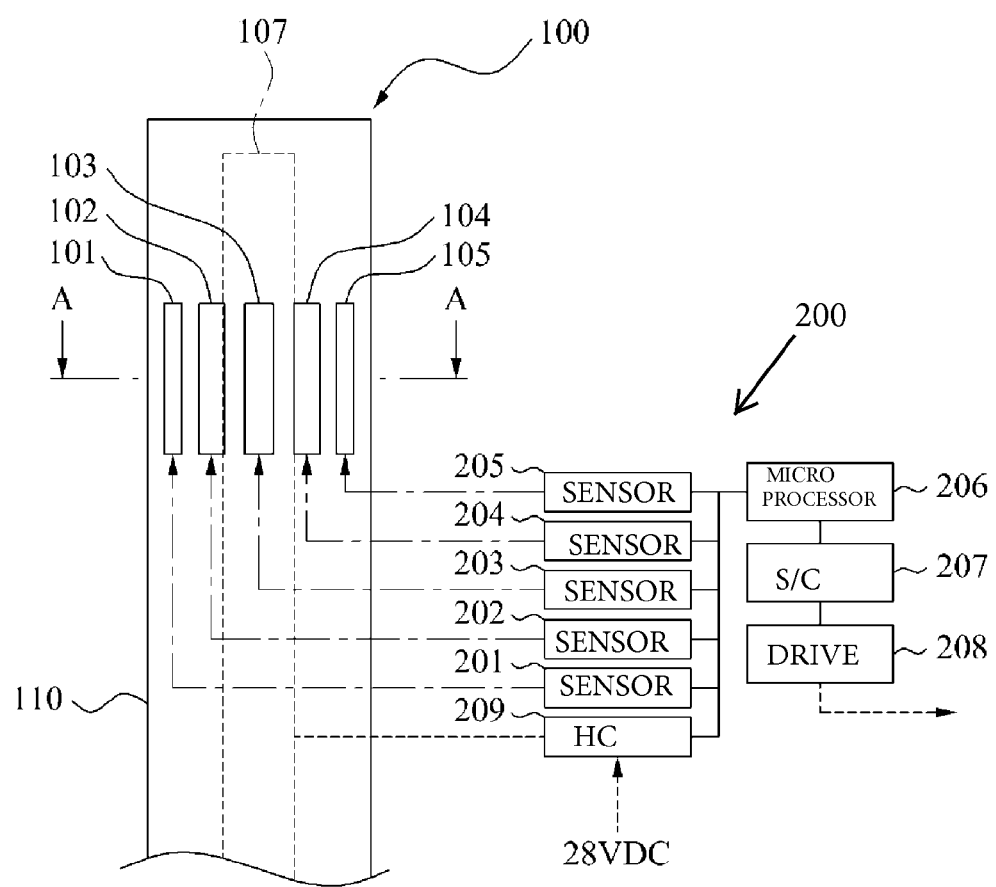
FIG. 1 is a diagram illustrating a data sensor device according to an embodiment of the present invention.

According to an aspect of the present invention, there is provided an air data sensor device that uses air flow around a cylinder, the air data sensor device including a sensor measurement unit, and a signal processing unit, wherein the sensor measurement unit includes a sensor body provided in a cylindrical form including a hollow inside, a plurality of pressure measurement holes disposed on an outside of the sensor body, and a thermostat attached to one side of the sensor body, and the signal processing unit includes a pressure sensor connected to the plurality of pressure measurement holes, and a microprocessor connected to the pressure sensor to perform calculation. A main pressure measurement hole having a high pressure value may be selected from the plurality of pressure measurement holes. Pressure distribution may be calculated, and at least one of an angle of attack, a static pressure, and a total pressure may be calculated using the pressure distribution.

The air data sensor device may further include a converter and a drive, wherein the converter is connected with the microprocessor to convert a signal and transmit the converted signal to the outside. The sensor measurement unit may further include a cartridge heater inserted in the sensor body. The signal processing unit may further include a heater controller connected to the cartridge heater to control the cartridge heater.

According to an aspect of the present invention, there is provided an air data sensor device which forms a plurality of pressure measurement holes on a sensor body having a cylindrical shape, measures pressure values of air flowing through the pressure measurement holes, selects a pressure measurement hole having a high pressure value among the plurality of pressure measurement holes, and calculates at least one of an angle of attack, a static pressure, and a total pressure using the pressure measurement hole.

According to the aforementioned structure, errors may be minimized in obtaining an angle of attack, a total pressure, and a static pressure. In particular, quick and accurate calculation may be achieved even under a low-speed and high-attack-angle condition. Since the air data sensor device is configured to easily insert a heater for preventing freezing when used for freezing prevention in an airplane, freezing may be prevented with a small size structure. An attack angle measurement area may be expanded by increasing a number of sensors around a cylinder, while maintaining the measurement accuracy.

Embodiments of the present invention may provide an air data sensor device causing minimum errors in obtaining an angle of attack, a total pressure, and a static pressure, and enabling quick and accurate calculation even under a low-speed high-attack-angle condition.

Also, embodiments of the present invention may provide an air data sensor device capable of preventing freezing even with a small size when used for freezing prevention in an airplane, by facilitating insertion of a heater.

Also, embodiments of the present invention may provide an air data sensor device capable of expanding an attack angle measurement area by increasing a number of sensors around a cylinder while maintaining the measurement accuracy.

Reference will now be made in detail to embodiments of the present invention applicable to vertical disposal, examples of which are illustrated in the accompanying drawings, wherein like reference numerals refer to the like elements throughout. However, not limited to the embodiments, the aspect of the present invention may also be applicable to horizontal proposal.

Figure 2:
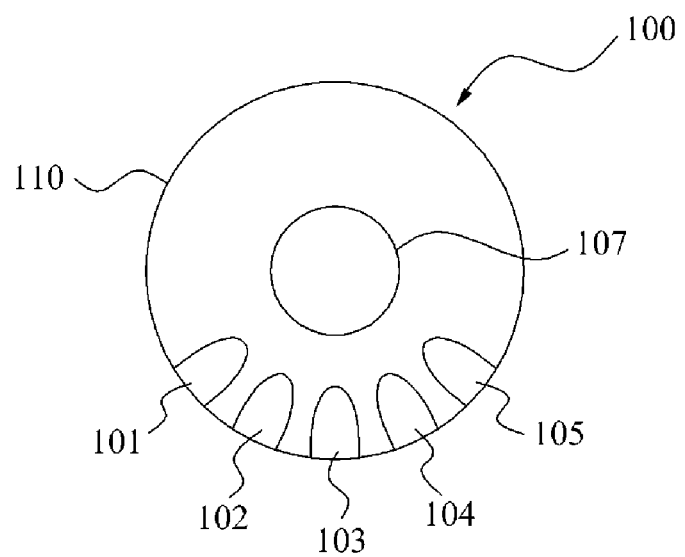
FIG. 2 is a sectional view of FIG. 1, cut along a line A-A.

FIG. 1 illustrates an overall air data sensor device 10 using an air flow, according to an embodiment of the present invention. FIG. 2 is a sectional view of FIG. 1, cut along a line A-A. As illustrated the air data sensor device 10 includes a sensor measurement unit 100 and a signal processing unit 200.

The sensor measurement unit 100 may include a sensor body 110 provided in a substantial cylindrical form. The sensor body 110 may include a hollow formed through a center. In addition, the sensor body 110 may further include pressure measurement holes 101 to 105 in the form of slots allowing passage of air for measurement of pressure. Although five pressure measurement holes 101 to 105 are employed as an example in the present embodiment, this is not limiting. Intervals among the pressure measurement holes 101 to 105 may be uniform or not. A cartridge heater 107 may be provided in the center of the sensor body 110 to prevent freezing. In addition, a thermostat (not shown) may be provided to one side of the sensor body 110 to control temperature.

The signal processing unit 200 may include a heater controller 209, pressure sensors 201 to 205, a microprocessor 206 for calculation, a converter 207 for signal conversion, and a drive 208.

The heater controller 209 may be connected with the cartridge heater 107 to control the cartridge heater 107, so that overheating and freezing at a low temperature are prevented. The pressure sensors 201 to 205 may be connected to the pressure measurement holes 101 to 105, respectively, and transmit pressure values to the microprocessor 206. Values calculated by the microprocessor 206 may be passed through the converter 207 and the drive 208 so that signals corresponding to the values are transmitted to an external controller, for example ARINC 429 controller.

Figure 3:
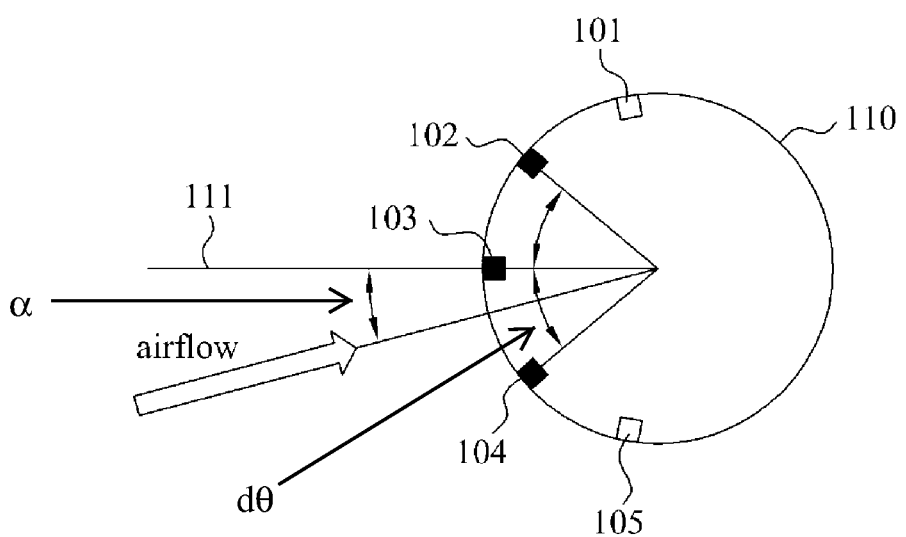
FIG. 3 is a conceptual diagram illustrating an equation according to an air flow, according to an embodiment of the present invention.

FIG. 3 is suggested to explain the calculation performed by the microprocessor 206. FIG. 3 is a conceptual diagram illustrating an equation according to an air flow, according to an embodiment of the present invention.

A reference line 111 denotes a straight line extended from the center of the sensor body 110 to the pressure measurement holes 101 to 105. α may denote an angle defined between the reference line 111 and the air flow, and dθ may denote angles, that is, intervals, between respective neighboring pressure measurement holes.

A pressure coefficient Cp around the sensor body 110 may have a uniform function irrespective of a speed between about 0° and about 30°, as shown in Equation 1 below. Here, ideal conditions are assumed.

$$C_p = \frac{p \cdot p_\omega}{\frac{1}{2}\rho v^2} = 1 - \kappa \sin^2(\alpha) \quad \text{[Equation 1]}$$

Here, $p_\infty$ may denote a pressure value under infinity. In case of an ideal flow, k may be 4.

The air data sensor device 10 may search for a pressure measurement hole having a highest pressure value among the five pressure measurement holes 101 to 105, and additionally select two neighboring pressure measurement holes with respect to the pressure measurement hole. Referring to FIG. 3, the pressure measurement hole 103 is applied with a highest pressure and therefore the pressure measurement holes 102 and 104 neighboring the pressure measurement hole 103 are automatically selected.

Values A and B meeting Equation 2 may be easily obtained when pressure values of the three pressure measurement holes 102 to 104 are obtained. Equation 2 may be simply deduced from Equation 1 using a trigonometric function formula. Pt, Ps, and α may be obtained when the values A and B are obtained.

Figure 4:
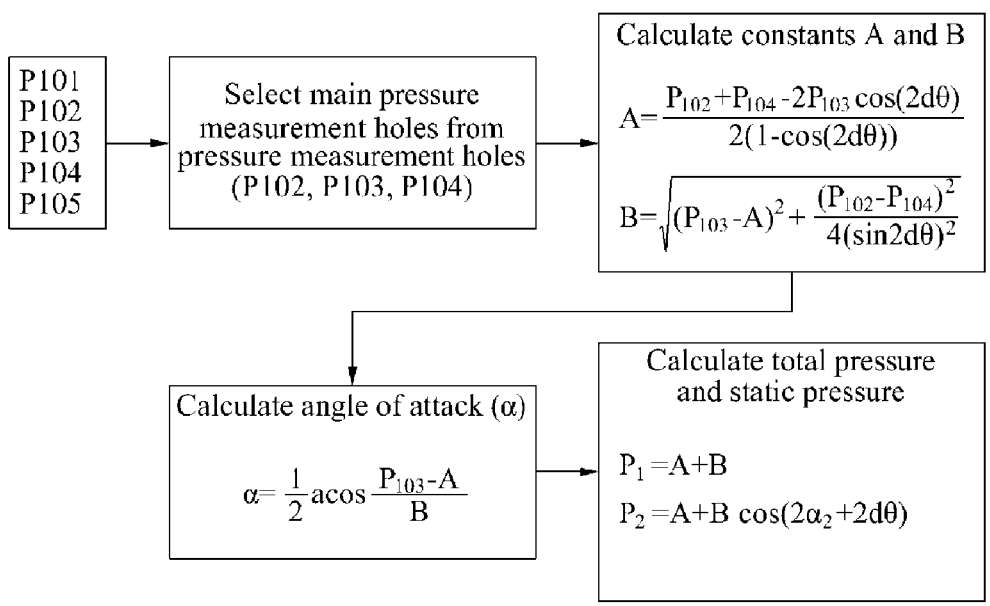
FIG. 4 is a flowchart illustrating a calculation process, according to an embodiment of the present invention.

That is, That is, Pt, Ps, and α may be obtained using $$P_t - q\frac{\kappa}{2} = A, \quad \frac{q\kappa}{2} = B,$$

the trigonometric function formula, and the measured pressure values according to Equation 2, as shown in FIG. 4.

$$P(\alpha, \theta) = A + B \cos(2\alpha + 2d\theta) \quad \text{[Equation 2]}$$

$$A = \frac{P_{102} + P_{104} - 2P_{103} \cos 2d\theta}{2(1 - \cos 2d\theta)}$$

$$B = \sqrt{(P_{103} - A)^2 + \frac{(P_{102} - P_{104})^2}{4(\sin 2d\theta)^2}}$$

Using a result, the angle of attack (α), the total pressure (Pt), and the static pressure (Ps) may be arranged into Equation 3.

$$\alpha = \frac{1}{2}a\cos\frac{(P_{103} - A)}{B} \quad \text{[Equation 3]}$$

$$P_t = A + B$$

$$P_s = A + B \cos(2\alpha_s + 2\theta), \alpha_s = a\sin\left(\sqrt{(1/\kappa)}\right)$$

$$q_c = P_t - P_s = \frac{2B}{\kappa}$$

In the above equation, k may be obtained through a wind tunnel test or computational fluid dynamics (CFD), and expressed by a function of Pt or Ps. The angle of attack, the total pressure, and the static pressure obtained by the above equation may be finally used for calculating a speed and altitude of an airplane. That is, three main pressure measurement holes having high pressure values with respect to an air flow direction are selected, and then pressure distribution is arithmetically calculated. In addition, for use in an airplane, a structure enabling insertion of a cartridge heater for preventing internal freezing is necessary.

FIG. 4 is a flowchart illustrating a calculation process, according to an embodiment of the present invention.

As aforementioned, pressure at each pressure measurement hole is measured and main pressure measurement holes having high pressure values are selected. In the present embodiment, three pressure measurement holes 102, 103, and 104 may be selected. Next, constants A and B are calculated. The angle of attack a is calculated using the constants A and B, thereby calculating the total pressure and the static pressure.

According to the present embodiment, the angle of attack, the total pressure, and the static pressure are obtained after a pressure distribution function is obtained using three pressure measurement results. Therefore, air data may be obtained quickly and accurately irrespective of a speed and the angle of attack. In addition, a heater for preventing freezing may be easily built in with a simple structure. As a result, a small size and a low cost may be achieved. Furthermore, when a number of sensors around a cylinder is increased, an attack angle measurement area may be proportionally increased maintaining the same measurement accuracy.

The invention claimed is:

1. An air data sensor device that uses air flow around a cylinder, the air data sensor device comprising:
　a sensor measurement unit; and
　a signal processing unit,
　wherein the sensor measurement unit comprises:
　a sensor body provided in a cylindrical form including a hollow inside;
　a plurality of pressure measurement holes disposed on an outside of the sensor body; and
　a thermostat attached to one side of the sensor body,
　wherein the signal processing unit comprises:
　　a pressure sensor connected to the plurality of pressure measurement holes to measure a pressure value at each measurement hole; and
　　a microprocessor connected to the pressure sensor to perform at least one calculation;
　wherein the signal processing unit is configured to:
　　determine which pressure measurement hole has a largest measured pressure value in comparison to each of the other measured pressure values;
　　calculate a pressure distribution utilizing a subset of the measured pressure values that is smaller than a total number of all measured pressure values, the subset including the largest measured pressure value; and
　　using the calculated pressure distribution, calculate at least one of an angle of attack, a static pressure, and a total pressure.

2. The air data sensor device of claim 1, further comprising a converter and a drive,
　wherein the converter is connected with the microprocessor to convert a signal and transmit the converted signal to another device.

3. The air data sensor device of claim 1, wherein the sensor measurement unit further comprises a cartridge heater inserted in the sensor body.

4. The air data sensor device of claim 1, wherein the signal processing unit further comprises a heater controller connected to the cartridge heater to control the cartridge heater.

5. An air data sensor comprising:
　a sensor body having a cylindrical shape and a plurality of pressure measurement holes disposed along the sensor body; and
　a signal processing unit configured to:
　　obtain measured pressure values of air flowing through the pressure measurement holes;
　　select a pressure measurement hole from the plurality of pressure measurement holes having a largest measured pressure value in comparison to each of the other measured pressure values; and
　　calculate at least one of an angle of attack, a static pressure, and a total pressure utilizing a subset of the measured pressure values that is smaller than a total number of all measured pressure values, the subset including the largest measured pressure value.

6. The air data sensor device of claim 5, wherein the sensor body comprises a cartridge heater.

\* \* \* \* \*